(12) United States Patent
Togaru et al.

(10) Patent No.: US 6,553,775 B2
(45) Date of Patent: Apr. 29, 2003

(54) VEHICLE AIR CONDITIONING SYSTEM

(75) Inventors: Kazuhiro Togaru, Aichi (JP); Hiroyuki Asada, Aichi (JP)

(73) Assignee: Mitsubishi Jidosha Kogyo Kabushiki Kaisha, Tokyo (JP)

(*) Notice: Subject to any disclaimer, the term of this patent is extended or adjusted under 35 U.S.C. 154(b) by 37 days.

(21) Appl. No.: 09/875,102

(22) Filed: Jun. 7, 2001

(65) Prior Publication Data

US 2002/0184899 A1 Dec. 12, 2002

(30) Foreign Application Priority Data

Jun. 7, 2000 (JP) .................................... 2000-170019

(51) Int. Cl.$^7$ ................................................ F02D 41/16
(52) U.S. Cl. ..................................... 62/133; 123/339.17
(58) Field of Search ............................... 62/133, 323.1, 62/230, 243, 244, 203, 228.1, 228.3, 228.4, 228.5, 323.4; 123/339.17, 339.23

(56) References Cited

U.S. PATENT DOCUMENTS 5,199,272 A * 4/1993 Yamanaka et al. ............. 62/133
5,285,649 A * 2/1994 Yamanaka et al. ......... 62/323.1 X
5,752,387 A * 5/1998 Inagaki et al. ............. 123/339.17
5,924,296 A * 7/1999 Takano et al. ................. 62/133
6,035,652 A * 3/2000 Hashimoto ............... 123/339.17

FOREIGN PATENT DOCUMENTS

JP          11153052 A         6/1999

* cited by examiner

Primary Examiner—Harry B. Tanner
(74) Attorney, Agent, or Firm—Birch, Stewart, Kolasch & Birch, LLP

(57) ABSTRACT

A vehicle air conditioning system controls an engine and an air conditioner according to an air-conditioner load to thereby improve fuel economy and drivability of the vehicle. A higher compressor torque between a first estimated compressor torque, which is estimated according to the outside air temperature and the vehicle speed, and a second estimated compressor torque, which is estimated according to the refrigerant pressure, is adopted as an estimated compressor torque. When an air conditioner control switch is ON, an operational status of an engine and a compressor are controlled according to the adopted estimated compressor torque.

13 Claims, 4 Drawing Sheets

FIG. 2

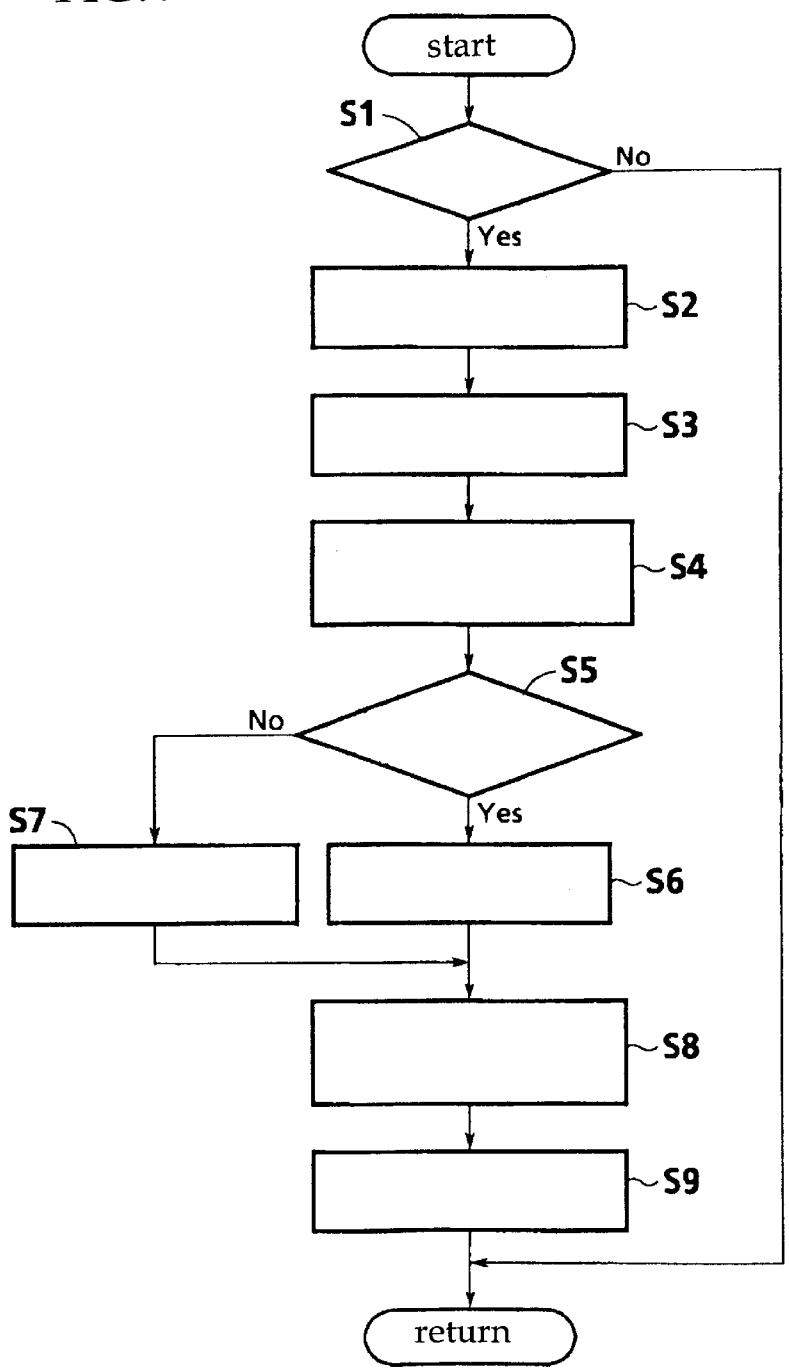

S1 air conditioner SW ON?
S2 read vehicle speed V, outside air temperature T, and refrigerant pressure P
S3 calculate second estimated torque
S4 calculate first estimated torque by estimating refrigerant pressure according to outside air temperature T and vehicle speed V
S5 second estimate torque < first estimated torque
S6 first estimate torque → compressor torque
S7 second estimated torque → compressor torque
S8 control engine according to estimated compressor torque
S9 control compressor

VEHICLE AIR CONDITIONING SYSTEM

This application claims the benefit of Japanese Application No. 2000-170019, filed on Jun. 7, 2001, which is hereby incorporated by reference.

BACKGROUND OF THE INVENTION

1. Field of the Invention

This invention relates to a vehicle air conditioning system that integrally controls an air conditioner and an engine.

2. Description of the Related Art

A vehicle is equipped with an air conditioning system that controls temperature, humidity, air flow, and ventilation in a vehicle compartment. An air conditioner unit of this air conditioning system is comprised of a ventilator (having a ventilating function), a heater (having a heating function), and a cooler (having cooling and dehumidifying functions). The cooler executes the cooling and dehumidifying functions by heat exchange by evaporation and liquefaction of a refrigerant. The cooler is comprised of a compressor, a condenser, and a cooling unit (having an expansion valve and an evaporator). More specifically, refrigerant, in the form of a low pressure gas, is compressed by a compressor 12 and therefore changes it into a high temperature/high pressure gas. The gas refrigerant is then cooled and liquefied by wind due to traveling of the vehicle and a cooling fan, and the refrigerant, in the form of high pressure liquid, is rapidly expanded by the expansion valve 15 and becomes easier to atomize. Fins formed around the evaporator 16 deprive heat from the liquid refrigerant and change it into gas refrigerant. During the evaporation, the refrigerant is deprived of a large amount of heat, and changes into the low-pressure gas again and is returned to the compressor.

In the case of an engine that operates such an air conditioning system, if an air conditioner control switch is turned on while the engine is idling, a load for operating the compressor is applied to the engine. Accordingly, a throttle angle is increased to raise an idle speed.

Recently, a lean burn internal combustion engine, which is operated at a substantially leaner air-fuel ratio than a stoichiometrical air-fuel ratio in order to improve the fuel economy, has been developed. This lean burn internal combustion engine is operated at a lean air-fuel ratio in a light load operating range, e.g. when the engine is idling. If the air conditioner control switch is turned on while the lean burn internal combustion engine is idling, however, the engine requires a compressor operating torque. Accordingly, the idle speed is raised and the engine is inhibited from operating at the lean air-fuel ratio, so that the engine can be mandatorily operated at a stoichiometrical air-fuel ratio. This causes deterioration of the fuel economy. Further, the air conditioner load (i.e., the compressor torque) varies according to the season (the outside air temperature). The idle speed is ordinarily raised on the basis of the maximum air conditioner load in order to prevent the engine from stalling when the air conditioner operating load is increased. In this case, the compressor torque changes greatly and causes rough idling. Therefore, the idle speed overshoots and deteriorates the drivability.

To address this problem, a device as disclosed in Japanese Patent Provisional Publication No. 11-153052 has been developed. This publication discloses that, in a "control device for controlling an air-fuel ratio when an internal combustion engine is idling," if the air conditioner load is applied when the engine that is allowed to operate at a lean air-fuel ratio is idling, a refrigerant pressure at the outlet side of a compressor is detected as a value corresponding to the air conditioner load to control the air-fuel ratio.

In the above-mentioned conventional device disclosed in the Japanese publication, a refrigerant pressure sensor detects the refrigerant pressure at the outlet side of the compressor as a value corresponding to the air conditioner load, and a control unit controls the air-fuel ratio according to the detected refrigerant pressure.

The refrigerant pressure at the outlet side of the compressor, however, is nearly zero just after the air compressor starts operating, and the refrigerant pressure start rising when a predetermined period of time has elapsed after the compressor starts operating. That is, just after the compressor starts operating, the refrigerant pressure sensor detects the refrigerant pressure with delay. Thus, the refrigerant pressure cannot correspond to the actual air conditioner operating load. It is therefore impossible to control the air-fuel ratio according to the actual air conditioner load.

SUMMARY OF THE INVENTION

It is therefore an object of the present invention to provide a vehicle air conditioning system that controls an engine and an air conditioner according to an air conditioner operating load to thereby improve fuel economy and drivability.

To attain the above object, the present invention provides a vehicle air conditioning system comprising: a compressor driven by an engine and circulates a refrigerant for an air conditioner; an outside air temperature sensing device that senses an outside air temperature; a vehicle speed sensing device that senses a vehicle running speed; a compressor torque estimating device that estimates a compressor torque required by the compressor of the air conditioner, the compressor torque estimating device estimating a first compressor torque according to the outside air temperature sensed by the outside air temperature sensing device and the vehicle running speed sensed by the vehicle speed sensing device; and a control device for controlling an operational status of the engine according to the first compressor torque.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 is a flow chart of a controlling operation carried out by a vehicle air conditioning system;

DETAILED DESCRIPTION OF THE PREFERRED EMBODIMENT

A preferred embodiment of the present invention will, hereunder, be described in further detail with reference to the accompanying drawings.

Figure 1:
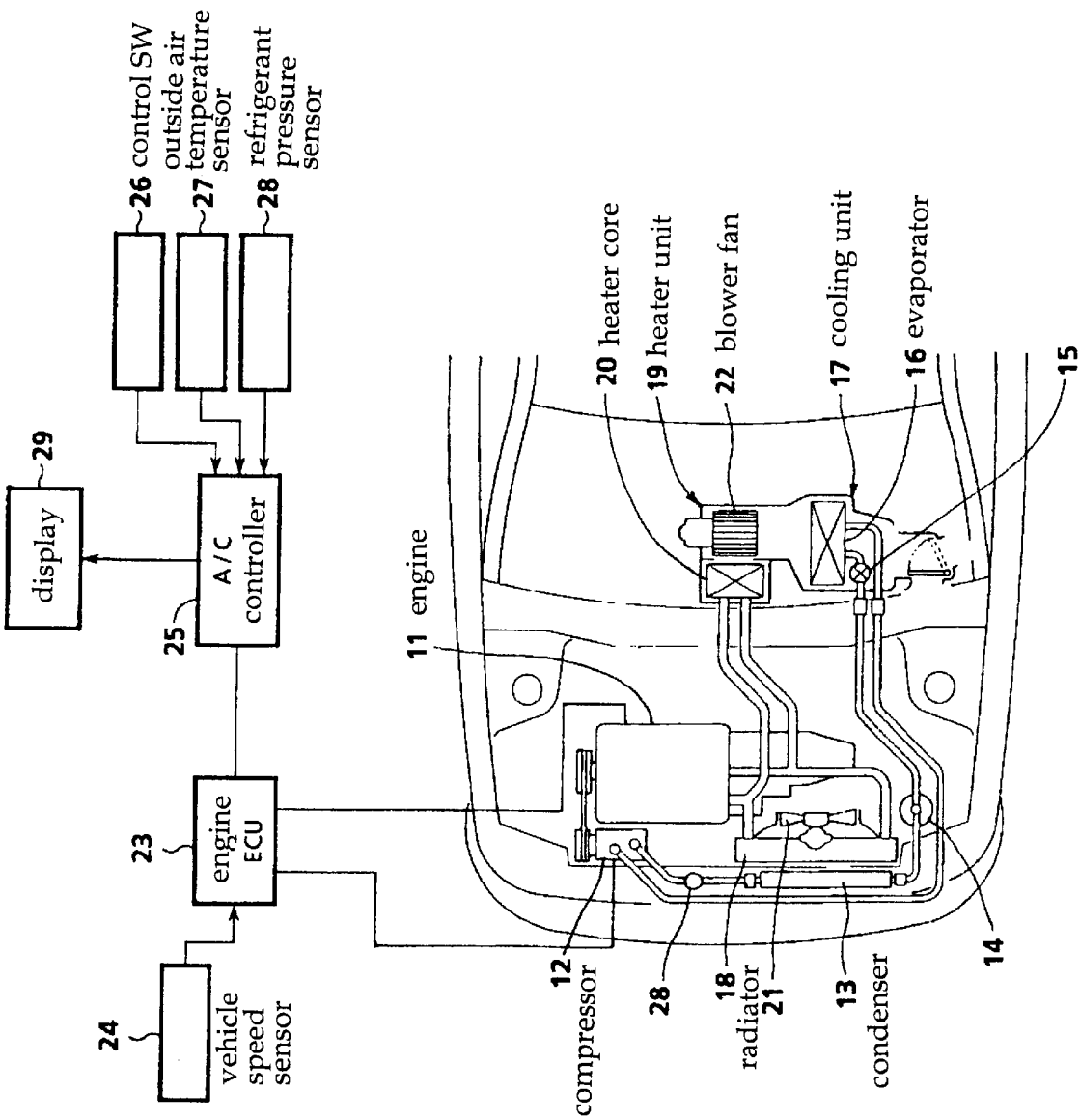
FIG. 1 is a schematic block diagram showing a vehicle air conditioning system according to an embodiment of the present invention.
Figure 3:
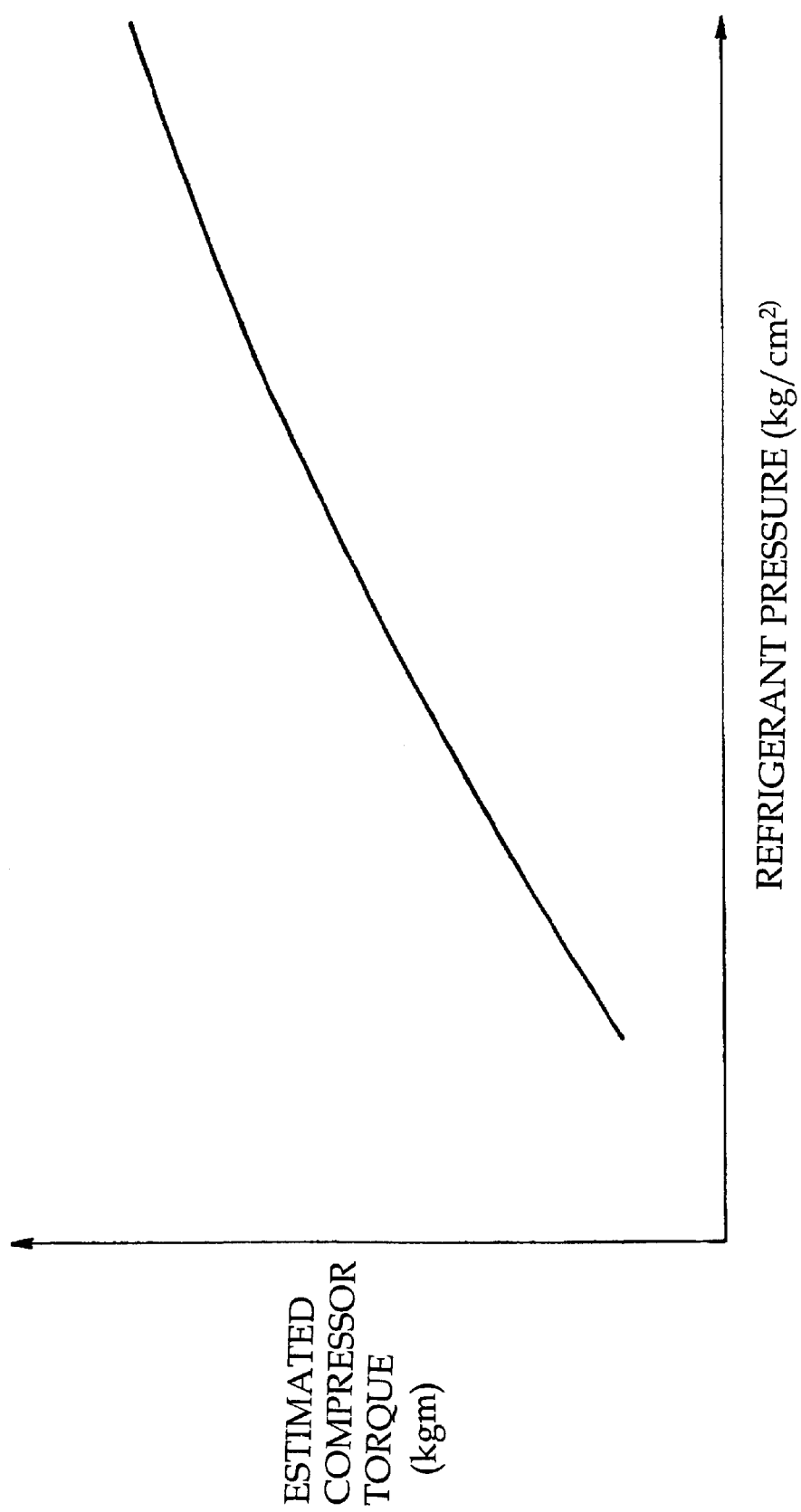
FIG. 3 is a graph showing a relationship between the compressor torque and the refrigerant pressure.
Figure 4:
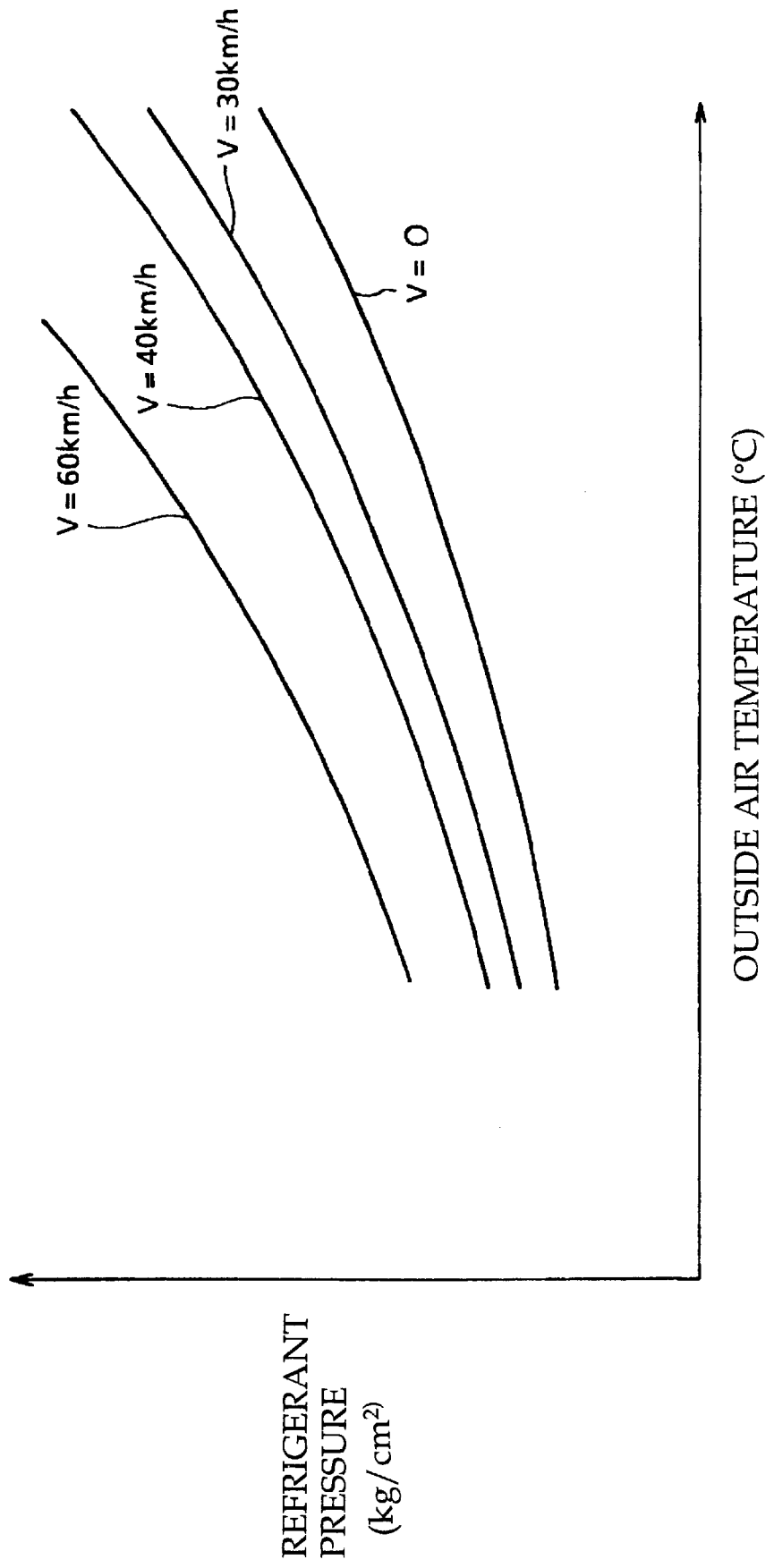
FIG. 4 is a graph showing a relationship between the refrigerant pressure and the outside air temperature.

FIG. 1 is a schematic block diagram showing a vehicle air conditioning system according to an embodiment of the present invention; FIG. 2 is a flow chart of a controlling operation carried out by a vehicle air conditioning system;

FIG. 3 is a graph showing a relationship between the compressor torque and the refrigerant pressure; and FIG. 4 is a graph showing a relationship between the refrigerant pressure and the outside air temperature.

FIG. 1 shows a vehicle air conditioning system according to the present embodiment. An air conditioner unit has a cooler (having cooling and dehumidifying functions), a heater (having a heating function), and a ventilator (having a ventilating function). The cooler performs heat exchange by evaporation and liquefaction of a refrigerant. In the cooler, a compressor 12, run by an engine 11, is connected to a condenser 13. The condenser 13 is connected to a cooling unit 17, which is comprised of an expansion valve 15 and an evaporator 16, through a receiver 14. The cooling unit 17 is connected to the compressor 12. With this arrangement, the refrigerant in the form of a low-pressure gas is compressed by the compressor 12 and therefore changes into a high temperature/high pressure gas. The high temperature/high pressure gas is then cooled and liquefied by wind due to running of the vehicle and a fan, so that the refrigerant in the form of high pressure liquid is rapidly expanded by the expansion valve 15, and therefore becomes easier to atomize. Fins formed around the evaporator 16 deprive heat from the refrigerant and change it into a gas refrigerant. During the evaporation, the refrigerant is deprived of a large amount of heat, and changes into the low-pressure gas again, and is returned to the compressor 12.

In the heater, cooling water (warm water) of a radiator in a water-cooled engine is used as a heat source. A water jacket, not shown, in the engine 11 is connected to a radiator 18 via a circulating path and is also connected to a heater core 20 of a heater unit 19. The radiator 18 has a radiator fan 21, and the heater unit 19 has a blower fan 22. With this arrangement, the cooling water is heated by the water jacket in the engine 11 and is sent to the radiator 18. A part of the cooling water is sent to the heater core 20, and the heater core 20 is deprived of heat by the wind from the blower fan 22 to warm the air. The cooling water, deprived of the heat, is returned to the engine 11.

The ventilator performs natural ventilation and mandatory ventilation. The natural ventilation is performed by using wind pressure generated by the running vehicle. The outside air is taken in from an intake port at the front of the vehicle and is discharged from the rear of the vehicle through an exhaust port. In the mandatory ventilation, the outside air is mandatorily taken in by an electric fan disposed between the intake port and an air outlet for discharging the air into the vehicle. In the ventilator, an outside air suction and an inside air circulation may be selectively switched to one another. The outside air suction is basically performed, but the inside air circulation is more efficient for cooling and heating.

The engine 11 is connected to an ECU (electronic control unit) 23 that totally controls the air conditioner, according to the present embodiment, and the engine 11. More specifically, the ECU 23 is connected to a vehicle speed sensor (vehicle speed sensing means) 24 and a variety of other sensors, not shown, such as an engine speed sensor, an accelerator opening sensor, and an air flow sensor. A proper amount of fuel is injected at a proper timing, and an ignition plug performs ignition at a proper timing based on optimum values of a fuel injection volume, an ignition timing, etc., which are calculated according to information from those sensors.

The ECU 23 is connected to an A/C (air-conditioning) controller 25, which receives necessary information such as the vehicle speed and the engine speed. On the other hand, the A/C controller 25 is connected to an air conditioner control switch (air conditioner operating state sensing means) 26, an outside air temperature sensor (outside air temperature sensing means) 27 and a refrigerant pressure sensor (high-pressure refrigerant pressure sensing means) 28, provided at the outlet side of the compressor 12, to detect the refrigerant pressure. The ECU 23 turns the compressor 12 on and off according to information from the A/C controller 25. The operating state of the air conditioner is shown on a display 29 provided on an instrument panel of the A/C controller 25.

In the air conditioning system constructed in the above-mentioned manner, a load for operating the compressor 12 is applied to the engine 11 when the air conditioner control switch 26 is turned on while the engine is idling or while the vehicle is running. To address this problem, in the present embodiment, a first estimated compressor torque of the air conditioner is estimated on the basis of an outside air temperature and the vehicle speed (the first compressor torque estimating means), and a second estimated compressor torque is estimated on the basis of the refrigerant pressure (the second compressor torque estimating means). The ECU (control means) 23 adopts one of the first and second estimated compressor torques, having a greater value, as an estimation compressor torque. When the air conditioner control switch is ON, the ECU 23 controls the operational status of the engine 11 and the compressor 12 (the operating state of the air conditioner) according to the adopted estimated compressor torque.

More specifically, as shown in the flow chart of FIG. 2, it is determined in step S1 whether the air conditioner control switch 26 is ON or OFF. If the air conditioner control switch 26 is OFF, the process ends without doing anything. If the air conditioner control switch 26 is ON, the vehicle speed V, the outside air temperature T, and the refrigerant pressure P are read from the vehicle speed sensor 24, the outside air temperature sensor 27, and the refrigerant pressure sensor 28, respectively.

In the next step S3, the second estimated compressor torque of the compressor 12 is estimated according to the refrigerant pressure P. Since the refrigerant pressure P and the compressor torque are correlated, the second estimated compressor torque can be found with reference to the graph shown in FIG. 3. The second estimated compressor torque may also be found by a correlation equation based on the graph shown in FIG. 3. In step S4, the refrigerant pressure P is estimated according to the outside air temperature and the vehicle speed V, and the first estimated compressor torque of the compressor 12 is estimated according to the estimated refrigerant pressure. The estimated refrigerant pressure can be found with reference to the graph shown in FIG. 4 since the refrigerant pressure and the outside air temperature T are correlated and the refrigerant pressure varies according to the vehicle speed V. The first compressor torque of the compressor 12 can be estimated according to the estimated refrigerant pressure with reference to the graph shown in FIG. 3. The first compressor torque of the compressor 12 may also be found by a correlation equation based on the graph shown in FIG. 4.

After the first and second estimated compressor torques are found in the above-mentioned manner, they are compared with each other in step S5. In steps S6 and S7, a higher compressor torque is adopted as the estimated compressor torque. More specifically, the air conditioner control switch 26 and the compressor 12 are not turned on at the same time, but the compressor 12 is turned on after the engine 11 is controlled according to the air conditioner load, e.g. the engine speed is increased and the air-fuel ratio is made rich. For this reason, the refrigerant pressure (a value detected by the refrigerant pressure sensor 28) P at the outlet side of the compressor 12 is zero when the air conditioner control switch 26 is turned on.

Thus, the first estimated compressor torque, determined based on the outside temperature T and the vehicle speed V, is adopted just after the air conditioner control switch 26 is turned on (until a predetermined period of time elapses). More specifically, in the step S5, the first estimated compressor torque, determined based on the outside temperature T and the vehicle speed V, is higher than the second estimated compressor torque being almost zero, and the process proceeds to the step S6 to adopt the first estimated compressor torque. In the next step S8, the operational status of the engine 11 is changed according to the adopted first estimated compressor torque. More specifically, if the engine is idling, the accelerator opening is increased to raise the engine speed. If the vehicle is running, the target air-fuel ratio is made slightly richer to switch the operation at the lean air-fuel ratio to the operation at the stoichiometrical air-fuel ratio, if necessary.

After the engine 11 is controlled according to the air conditioner load, the compressor 12 is turned on in step S9.

On the other hand, if the air conditioner control switch 26 is turned on and the compressor 12 is turned on, the refrigerant pressure P, detected by the refrigerant pressure sensor 28, is a predetermined value. Thus, the second estimated compressor torque based on this refrigerant pressure P is adopted. Ordinarily, the second estimated compressor torque, which can be found with high accuracy, is ordinarily higher than the first estimated compressor torque based on the outside air temperature T and the vehicle speed V. Thus, the process goes to step S7 to adopt the second estimated compressor torque. In the next step S8, the operational status of the engine 11, such as the engine speed and the target air-fuel ratio, is changed according to the adopted second estimated compressor torque. If the compressor 12 has already been turned on, nothing is done in step S9.

As set forth hereinabove, the vehicle air conditioning system, according to the present embodiment, adopts a higher of the estimated compressor torques between the first estimated compressor torque, determined based on the outside air temperature T and the vehicle speed V, and the second estimated compressor torque, determined based on the refrigerant pressure P. When the air conditioner control switch is ON, the vehicle air conditioning system controls the operational status of the engine 11 and the compressor 12 according to the adopted estimated compressor torque.

Thus, if the refrigerant pressure P, detected by the refrigerant pressure sensor 28, is almost zero just after the air conditioner control switch 26 is turned on and before the compressor 12 starts operating, the operational status of the engine 11 is controlled according to the first estimated compressor torque, determined based on the outside temperature T and the vehicle speed V, and the compressor 12 is then turned on. It is therefore possible to properly recognize the air conditioner operating load even before the compressor 12 starts operating, and accurately control the throttle angle, the air-fuel ratio, etc. of the engine 11, and properly turn on the compressor of the air conditioner. This improves fuel economy and drivability of the vehicle. On the other hand, if the compressor 12 has already been turned on, the refrigerant pressure P, detected by the refrigerant pressure sensor 28, is a predetermined value. Thus, the operational status of the engine 11 is controlled according to the second estimated compressor torque estimated on the basis of this refrigerant pressure P. It is therefore possible to execute the continuously feedforward-control of the operational status of the engine with high accuracy.

The air conditioner operating load, which is applied to the engine 11 by the operation of the compressor 12, slightly varies according to the outside air temperature, the amount of refrigerant, the amount of solar radiation, and the like. Thus, even when the vehicle is running, the first estimated compressor torque, determined based on the outside temperature T and the vehicle speed V, may be higher than the second estimated compressor torque, determined based on the refrigerant pressure P. Since a higher torque between the first and second estimated compressor torques is adopted in the step S5, the first estimated compressor torque is adopted if the first estimated compressor torque increases according to a variation in the external load such as the outside air temperature. This enables the proper controlling operation according to the estimated engine torque even when the compressor 12 is operating.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A vehicle air conditioning system, comprising:
    a compressor driven by an engine, said compressor circulating a refrigerant for an air conditioner;
    an outside air temperature sensing device that senses an outside air temperature;
    a vehicle speed sensing device that senses a vehicle running speed;
    a compressor torque estimating device that estimates a compressor torque required by said compressor of said air conditioner, said compressor torque estimating device estimating a first compressor torque according to the sensed outside air temperature and the sensed vehicle running speed; and
    a control device for controlling an operational status of said engine according to said first compressor torque.

2. A vehicle air conditioning system according to claim 1, further comprising:
    a high-pressure refrigerant pressure sensing device for sensing a high pressure refrigerant pressure in a refrigerant circuit provided in said air conditioner,
    wherein said compressor torque estimating device estimates a second compressor torque according to the high pressure refrigerant pressure sensed by said high-pressure refrigerant pressure sensing device, and
    said control device controls the operational status of said engine according to said first compressor torque or said second compressor torque.

3. A vehicle air conditioning system according to claim 2, wherein
    said control device controls the operational status of said engine according to a higher compressor torque between said first compressor torque or said second compressor torque.

4. A vehicle air conditioning system according to claim 1, wherein
    said control device controls said compressor after controlling the operational status of said engine.

5. A vehicle air conditioning system according to claim 2, further comprising:
an air conditioner control switch for turning on and off said air conditioner,
wherein said control device controls the operational status of said engine according to said first compressor torque until a predetermined period of time elapses after said air conditioner control switch is turned on.

6. A vehicle air conditioning system according to claim 2, wherein
said control device controls the operational status of said engine according to said first compressor torque when the high-pressure refrigerant pressure detected by said high-pressure refrigerant pressure sensing device is lower than a predetermined value.

7. A vehicle air conditioning system according to claim 1, further comprising:
an air conditioner control switch for turning on and off said air conditioner,
wherein said compressor torque estimating device estimates the first compressor torque before the compressor is turned on but after said air conditioner control switch is turned on.

8. A vehicle air conditioning system according to claim 1, further comprising:
an air conditioner control switch for turning on and off the air conditioner,
wherein said control device controls the operational status of the engine before the compressor is turned on but after said air conditioner control switch is turned on.

9. A vehicle air conditioning system, comprising:
a compressor for circulating air-conditioning refrigerant, said compressor being driven by an engine;
a compressor torque estimating device for estimating a compressor torque required by said compressor according to variations in an external load; and
a control device for controlling an operational status of said engine according to the compressor torque estimated by said compressor torque estimating device.

10. A method for controlling an engine in a vehicle air conditioning system having a compressor for circulating an air-conditioning refrigerant, the compressor being driven by an engine, a high-pressure refrigerant pressure sensing device for sensing a high-pressure refrigerant pressure, an outside air temperature sensing device for sensing an outside air temperature, and a vehicle speed sensing device for sensing a vehicle running speed, the method comprising:
estimating a first compressor torque according to the sensed outside air temperature and the sensed vehicle running speed; and
controlling an operational status of said engine according to said first compressor torque.

11. The method of controlling an engine according to claim 10, said vehicle air conditioning system further having an air conditioner control switch for turning on and off said air conditioner, the method further comprising:
sensing an ON state of said air conditioner control switch; and
controlling the operational status of said engine according to said first compressor torque until a predetermined period of time elapses after said air conditioner control switch is turned on.

12. The method of controlling an engine according to claim 7, further comprising:
estimating a second compressor torque required by said compressor according to the sensed high-pressure refrigerant pressure;
selecting a higher compressor torque between said first compressor torque and said second compressor torque,
wherein said controlling step includes the step of,
controlling the operational status of said engine according to the selected one of said first compressor torque and said second compressor torque.

13. A method for controlling an engine according to claim 10, the method further comprising:
sensing an ON state of said air conditioner control switch; and
controlling the operational status of said engine according to said first compressor torque before the compressor is turned on but after said air conditioner control switch is turned on.

* * * * *